US010425443B2

United States Patent
Ronen et al.

(10) Patent No.: US 10,425,443 B2
(45) Date of Patent: Sep. 24, 2019

(54) DETECTING VOLUMETRIC ATTACKS (71) Applicant: Microsoft Technology Licensing, LLC., Redmond, WA (US)

(72) Inventors: Royi Ronen, Tel Aviv (IL); Hani Neuvirth-Telem, Tel Aviv (IL); Shai Baruch Nahum, Netanya (IL); Yuri Gabaev, Givataim (IL); Oleg Yanovsky, Petah Tikva (IL); Vlad Korsunsky, Modi'in (IL); Tomer Teller, Tel Aviv (IL); Hanan Shteingart, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 15/182,331

(22) Filed: Jun. 14, 2016

(65) Prior Publication Data
US 2017/0359372 A1 Dec. 14, 2017

(51) Int. Cl.
*G06F 12/14* (2006.01)
*H04L 29/06* (2006.01)
*G06F 21/56* (2013.01)

(52) U.S. Cl.
CPC ........ *H04L 63/1458* (2013.01); *G06F 21/566* (2013.01); *H04L 63/101* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| 7,099,320 | B1* | 8/2006 | Salerno ............... H04L 63/1458 370/389 |
| 7,808,916 | B1 | 10/2010 | Futamura et al. |
| 8,397,284 | B2 | 3/2013 | Kommareddy et al. |
| 8,611,219 | B2 | 12/2013 | Golic |
| 8,613,089 | B1 | 12/2013 | Holloway et al. |
| 8,966,627 | B2 | 2/2015 | Yoon |
| 9,160,760 | B2 | 10/2015 | Vasseur et al. |
| 9,191,377 | B2 | 11/2015 | Charan et al. |
| 9,846,223 | B1* | 12/2017 | Hellwig ................... G01S 7/38 |

(Continued)

OTHER PUBLICATIONS

Yan, et al., "Hierarchical Method for Anomaly Detection and Attack Identification in High-speed Network", In Journal of Information Technology, vol. 11, Issue 9, Jun. 4, 2012, 7 pages.

(Continued)

*Primary Examiner* — Brandon S Hoffman
(74) *Attorney, Agent, or Firm* — Merchant & Gould P.C.

(57) ABSTRACT

Detecting a volumetric attack on a computer network with fewer false positives and while also requiring fewer processing resources is provided. The systems and methods described herein use observations taken at the network level to observe network traffic to form a predictive model for future traffic. When the network's future traffic sufficiently exceeds the predictive model, the monitoring systems and methods will indicate to the network to take security measures. The traffic to the network may be observed in subsets, corresponding to various groupings of sources, destinations, and protocols so that security measures may be targeted to that subset without affecting other machines in the network.

20 Claims, 7 Drawing Sheets

(56) References Cited

U.S. PATENT DOCUMENTS

| | | | |
|---|---|---|---|
| 2004/0257999 A1 | 12/2004 | MacIsaac | |
| 2005/0125195 A1 | 6/2005 | Brendel | |
| 2014/0325596 A1 | 10/2014 | Edwards et al. | |
| 2016/0028764 A1 | 1/2016 | Vasseur et al. | |
| 2016/0036837 A1 | 2/2016 | Jain et al. | |
| 2016/0203509 A1* | 7/2016 | Sharp, III | G06Q 30/0244 705/14.43 |
| 2016/0205134 A1* | 7/2016 | Smith | H04L 63/1458 726/23 |

OTHER PUBLICATIONS

Johnson, et al., "Network Anomaly Detection Using Autonomous System Flow Aggregates", In Proceedings of IEEE Global Communications Conference, Dec. 8, 2014, 8 pages.

"The F5 DDoS Protection Reference Architecture", In White Paper of F5, Feb. 5, 2016, 19 pages.

"Is Your Data Center Ready for Today's DDoS Threats?", In White Paper of Fortinet, Aug. 1, 2014, pp. 1-8.

"International Search Report and Written Opinion Issued in PCT Application No. PCT/US2017/036462", dated Aug. 16, 2017, 10 Pages.

IBM Security QRadar Users Guide; https://www.ibm.com/support/knowledgecenter/SS42VS_7.3.1/com.ibm.qradar. doc/b_qradar_users_guide.pdf (pp. 27, 45, 56, 66, 109, 149, 155 and 160) Last accessed on Feb 19, 2019; IBM Copyright 2012; 2017; 216 pages in total.

IBM QRadar Network Insights; https://www.ibm.com/in-en/marketplace/real-time-threat-identitication; Last accessed on Feb. 19, 2019; 4 pages.

QRadar Network Security IQNS (XGS); http://www-01.ibm.com/support/docview.wss?uid=swg21973599; Last accessed on Feb. 19, 2019; 4 pages.

IBM QRadar SIEM; Identify events that matter most; https://www.ibm.com/in-en/marketplace/ibm-qradar-siem; Last accessed on Feb. 19, 2019; 5 pages.

IBM Security QRadar Network Anomoloy Detection Version 7.2.1, Users Guide; IBM Copyright 2012; 2013; 257 pages in total.

* cited by examiner

DETECTING VOLUMETRIC ATTACKS

BACKGROUND

Malicious parties often seek to gain access to systems through a variety of means, including brute force attacks. Brute force attacks may be horizontal, in which the malicious party attempts to compromise the accounts of multiple legitimate users; vertical, in which the malicious party attempts multiple times to compromise the account of one legitimate user; or include both horizontal and vertical attacks. Additionally, attacks may be distributed, where multiple attackers attack one target; directed, where one attacker attacks one target; wide, where one attacker attacks multiple targets; and combinations thereof, which may include login attempts for brute force attacks or attempts to overwhelm the target(s) (such as a denial of service attack) or expose data from or manipulate data used by the targets (such as with a buffer overflow attack or SQL injection).

Malicious parties frequently make use of remote terminal access (RTA) protocols and productivity software to take control of multiple machines, physical or virtual, to carry out their attacks. This is a growing concern as more users turn to RTA to access virtual machines (VMs) run in a distributed computing environment remote from the users (i.e., the "cloud"). Users or administrators may close RTA ports which they do not use, shuffle the RTA numbers used, or set up allowed IP address lists, as protective measures to help block malicious attacks, but these steps may require significant resources to execute and the administrative ability to make the changes.

Malicious attacks, however, can be confused with legitimate communications, and network administrators have implemented various false-positive reduction schemes in addition to various security measures, which may improperly block IP addresses or secure accounts of legitimate users if the false-positive protections are not accurate enough. These false positives are frustrating to users, and require network administrators to expend resources to undo the security measure (e.g., unlock an account that was locked, restore access to files/systems that were blocked, remove an IP address from a blacklist) that was applied against the legitimate use case in response to a false positive.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein for enabling the distinguishing of brute force attacks from legitimate high-volume use by detecting anomalous behavior. The systems and methods of the present disclosure are operable to determine whether communications are part of an attack (which may include some legitimate communications sent contemporaneously) or represent normal operations at a high volume with fewer false positives than previous systems and methods. By monitoring traffic at the network level (e.g., at a router) instead of at the machine level, and sampling records of communications, the present disclosure outlines how an administrator may guard against attacks without having to install or run an agent on a machine or perform full traffic inspection.

Various models are applied to the sampled traffic to compare recent traffic to historic traffic, by which the error between expected amounts of traffic and actual observed amount of traffic is observed to determine whether the traffic is part of an attack, or naturally high. The amount of data that is analyzed is reduced by using existing network sampling, such as, for example, the Internet Protocol Information Export (IPFIX) protocol or the NetFlow protocol, that is used by the cloud service provider to analyze network traffic as it enters the cloud service provider's network for event logging, load balancing, message routing, etc.

By providing administrators with the ability to distinguish between brute force attacks and legitimate use at the network level, the present disclosure address a computer-centric problem and improves the efficiency and reliability of the systems themselves.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Distributed computing environments (DCE) provide users with access to a shared infrastructure of host machines according to several service models, including, but not limited to: Software as a Service (SaaS), where both software and hardware are provided; Platform as a Service (PaaS), where hardware and Operating Systems (OS) are provided for the user to run its application software on; or Infrastructure as a Service (IaaS), where the hardware is provided for the user to run its OS and application software on. In various aspects, hardware provided to users includes, but is not limited to: host machines, servers, storage networks, switches, routers, cabling, etc. DCEs include on-premises private clouds, hosted private clouds, service provider clouds, and public clouds. Examples of clouds include AZURE® (provided by Microsoft Corp., of Redmond, Wash.) and AMAZON WEB SERVICES™ (AWS) (provided by Amazon.com Inc., of Seattle, Wash.).

To access the services provided by the DCE, users will connect to one or more remote machines in the DCE with a computing device local to the user (a local machine) so that inputs and outputs may be received at the local machine, but the processing of those inputs and outputs will be handled by the remote machine. To establish this connection, a Remote Terminal Access (RTA) protocol or software employing one or more RTA protocols may be used by the user. RTA protocols include, but are not limited to: the remote desktop protocol (RDP), Telnet, Secure Shell, and virtual network computing (VNC).

Not all attempts to use a DCE are from legitimate users; malicious parties may attempt to gain access to a remote machine (e.g., to use or block the use of its computing resources, to gain access to files stored by that machine, to spy on the legitimate users). The attacks from malicious parties are made from one or more computing devices, and may include volumetric attacks. Volumetric attacks are attacks on one or more machines in the DCE that require a high volume of traffic to be successful and include: brute force attacks (including dictionary attacks), where the malicious party attempts to gain access by guessing several login credentials; and distributed denial of service attacks (DDOS), where the malicious party attempts to overwhelm a machine with requests for service, thus denying legitimate users the use of those services.

To protect against volumetric attacks, DCE administrators have implemented several protection and mitigation schemes, such as, for example, an Access Control List (ACL) that blocks or allows given IP addresses, dynamically scaling the resources available to a given service, reconfiguring an address of a service (moving it away from an attack and migrating legitimate users), and filtering or caching problematic requests that appear to be part of an attack. Oftentimes these schemes are triggered based on a threshold (e.g., a number of connection attempts within a time period, a number of unique IP address seeking connections), which can yield false positives; slowing or terminating a legitimate user's processes and requiring the expenditure of human and computing resources to implement (or reverse), which degrades the user experience, requires administrative time to solve, encourages the bypassing of security systems (to avoid the potential of a degraded user experience), and wastes computing resources. By providing administrators with the ability to distinguish between volumetric attacks and normal use with fewer false positives and collecting less data, the present disclosure address a computer-centric problem and improves the efficiency and reliability of the systems themselves that are involved.

Figure 1:
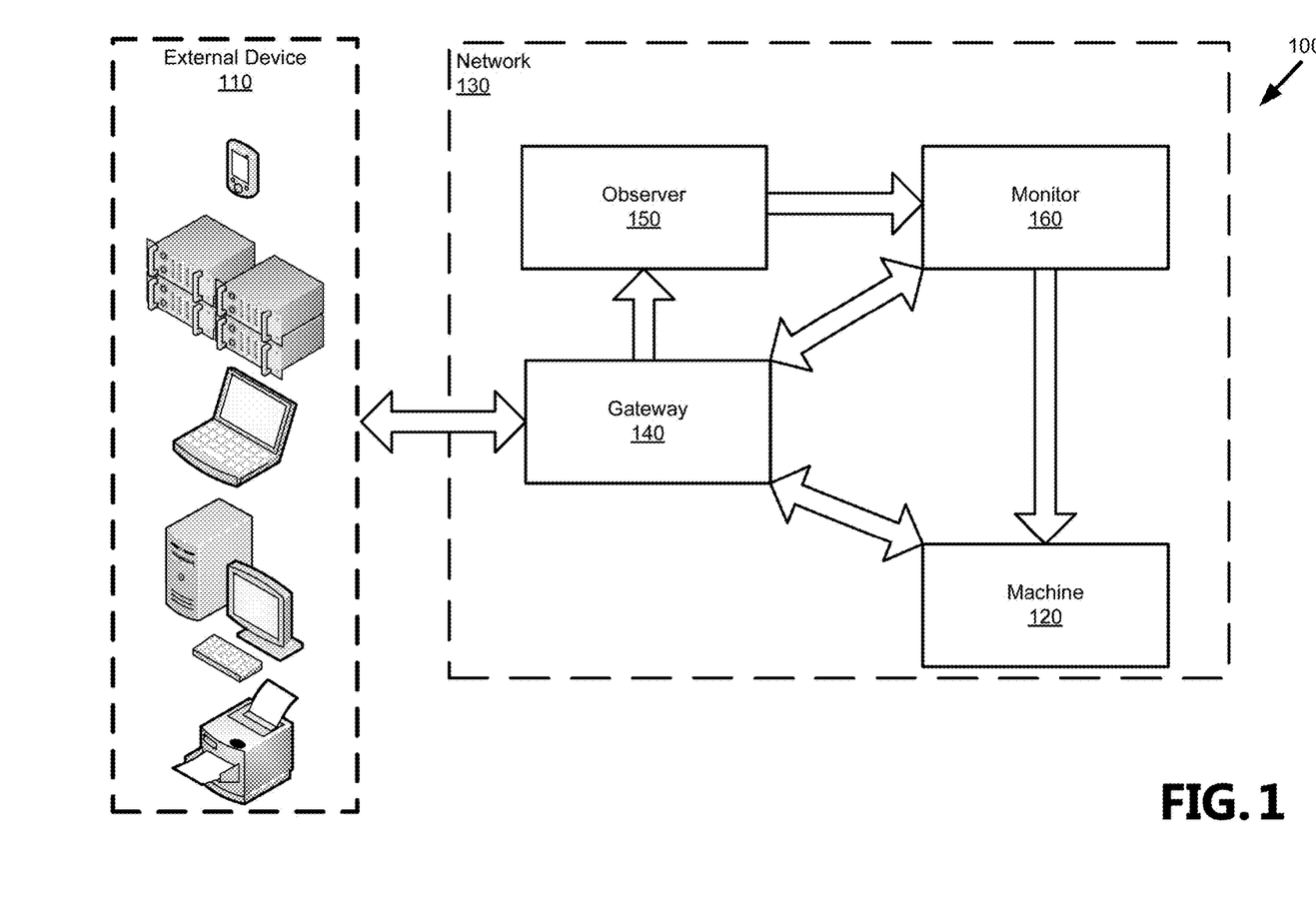
FIG. 1 illustrates an example environment in which service requests are handled by a system from various requesting devices.

FIG. 1 illustrates an example environment 100 in which service requests are handled by a system from various requesting devices. As illustrated, one or more external devices 110 attempt to communicate with machines 120 comprising a network 130. The external devices 110 connect to the network 130 via a gateway 140, which routes service requests to the machine(s) 120 designated by a service request. An observer 150 notes the flow of packets sharing properties to sample, and will alert a monitor 160 of trends in the flow. The monitor 160 will use the sampled flow data to determine whether the network traffic is indicative of an attack, and will execute the appropriate mitigation scheme when it is determined that an attack is occurring.

The external device 110, machine 120, gateway 140, observer 150, and monitor 160 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4, 5A, and 5B. In various aspects, the external devices 110 are accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). For example, a malicious party may control an external device 110 directly or via a malicious program (e.g., a virus) over a network as part of a "bot-net" to perform the brute volumetric attack from a plurality of external devices 110, which may be done without the knowledge or consent of the devices' owners. In another example, an external device 110 may be the computing devices used by a legitimate user seeking to access the network 130.

The machine(s) 120 may be a physical computing device or a virtual machine (VM) hosted by a physical computing device. VMs are run as instances on host machines, which are physical computing devices within the network 130. A given host machine may provide several VMs, which may be accessible by different users. For example, the host machine that provides first VM for a first user may also provide a second VM and a third VM for a second user. A hypervisor or host machine operating system manages the provision of the VMs to the tenants of the network 130 and how the computing resources are devoted to any given VM running on the host machines.

The gateway 140 is a hardware device, such as a network switch or a router, or a software service that links the external device 110 from the external network (e.g., the Internet) to the network 130. In various aspects, the gateway 140 may provide a firewall and may regulate the flow of communications traffic into and out of the local network. The gateway 140 forwards messages to the machine 120 from the external device 110 (as well as other devices on the internal network) and also forwards messages from the machine 120 to the external device 110. In various aspects, the gateway 140 may be provided by more than one device or service, for example, for load balancing purposes or to increase the capacity of the network 130.

The observer 150 is a hardware device or a software service in communication with the gateway 140 (or executed on the gateway 140) that observes the flow and amount of network traffic over the gateway 140, such as a traffic measurement probe used to measure the current traffic amount passing through a given component of the network 130. A timeslot is set by the observer 150, which counts the number of packets received during that timeslot sharing a given property. The length of time comprising a timeslot may be varied as can the properties by which packets are grouped. The observer 150 may group all the packets based on being, for example: from a given source, transmitted to a given destination, using the same protocol, being at/above/below a given size, and combinations thereof. Alternatively or additionally to counting the traffic sent over the gateway 140, the observer 150 may instead sample the number of active connections established through the gateway 140 at a given time. For example, the observer 150 may count the number of packets sent during a ten minute timeslot, or may sample the number of active connections from the gateway 140 every ten minutes. In various aspects, sampling may use existing data used or created by a packet flow protocol, such as, for example, NetFlow or IPFix, implemented in the network 130 to manage and balance loads of communications to and from the network 130. For example, the observer 150 may check a log file for the packet flow protocol for the timeslot being observed or may have the signals used to build that log file forwarded to the observer 150 to be grouped according to the grouping parameters used by the observer 150 to manage specific subsets of the network 130.

To illustrate, an example gateway 140 may have one thousand connections at a given time when the observer 150 sample it or counts the packets being transmitted. The observer 150 may, for example, have three groups set up that specify a subset of the communications handled by the gateway 140 to group together for analysis. The first group may be an analysis of the network 130 as a whole (that comprises the one thousand connections), the second group may be an analysis the subset of one tenant's machines 120 (that comprises a subset (e.g., 1, 100, 999) of the one thousand connections), and a third group may be an analysis of one type of machine 120 regardless of who the tenant is. As will be appreciated, other groups in addition to the above examples may be used by the observer 150 for the analysis of traffic for attack detection; the above are given as non-limiting examples.

IP packets are structured communications that denote a sender's IP address (real or fake), a receiver's IP address, the protocol of the message, and other addressing information in an unencrypted format at the gateway 140 so that those packets may be properly routed to or from the machines 120 hosted in the network 130. The observer 150 uses this addressing information, without needing to access the packet's potentially encrypted payload, to make its counts/samples for the appropriate subset of the machines 120 hosted in the network 130, so that the security measures taken in the network 130 can be targeted to just those machines 120 affected by an attack.

The monitor 160 receives the counts and/or samples from the observer 150 of the amount of overserved/current traffic and builds an understanding of network traffic received by the network 130 across several timeslots for the groups defined by the observation parameters. The counts and/or samples are correlated across time in regard to each other and previous/historical observations of the traffic amounts, which is discussed in greater detail in regard to FIGS. 2A and 2B, so that various historic use models are built to predict future traffic amounts for the machine groupings from historic usage data to determine whether a traffic pattern is benign or malicious.

By allowing a monitor 160 to detect potential attacks at the network level (rather than using the individual machines 120 that are the targets), the scope or scale of an attack may be realized with greater confidence and different solutions may be applied. For example, a wide attack hitting multiple machines 120 within the network 130 may be noticed by the monitor 160 despite none of the individual machines 120 noticing the attack, due to low volumes of requests to individual machines 120, but a high volume to the aggregated group. Additionally, fewer installations are required for the software used for attack detection and the processing of potential attacks is centralized; relieving the burden from the machines 120 and reducing memory storage space requirements. Moreover, the observer 150 and monitor 160 are independent of the OS used on or by the machines 120 and cannot be shut down by malware infecting those machines 120; improving the operational reliability of the network 130 as a whole.

In various aspects, the observer 150 or monitor 160 may employ traffic thresholds (for the number of connections or packets received within a given time period) to rapidly cut off an obvious attack or until historic use models are developed. As will be appreciated, for daily, weekly, or monthly use patterns to be noted, the observer 150 or monitor 160 must have seen the pattern at least once. Therefore, the historic use models may be disabled for attack detection until the time period has been observed n times (where n is a user defined number). For example, weekly patterns may need to be observed four times (e.g., over the course of one month) before a historic use model for a weekly use pattern for a machine 120 is enabled. When a similar machine 120 to a given machine 120 with an existing historic use pattern is brought online, it may use the existing historic use pattern without needing to wait for a new historic use model to be built, or may wait for a reduced amount of time to collect historic usage data. For example, a tenant may state that a first machine 120 and a second machine 120 are similar (e.g., a first user work station and a second user work station). In another example, the network 130 may automatically decide that two machines 120 are similar (e.g., when creating a new instance of a given machine 120 for load balancing purposes).

In various aspects, the observer 150 and the monitor 160 may be provided by separate devices or may be integrated into a single shared device. Similarly, the observer 150, monitor 160, or both may be incorporated into the gateway 140 as part of a physical gateway or router or as services within a virtual gateway or router.

Figure 2A:
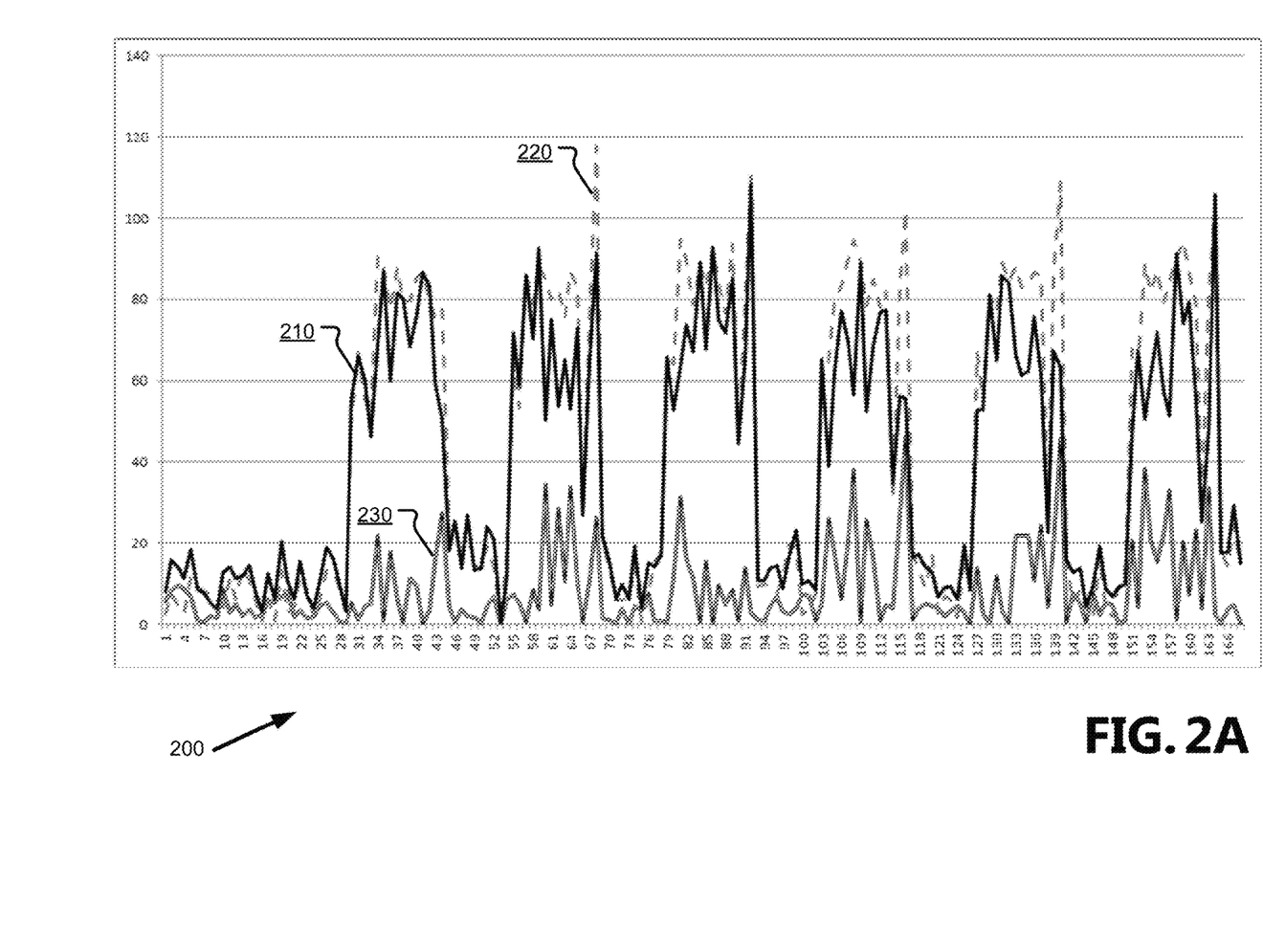
FIGS. 2A and 2B are an example histogram showing communication monitoring for a group sharing a given property.
Figure 2B:
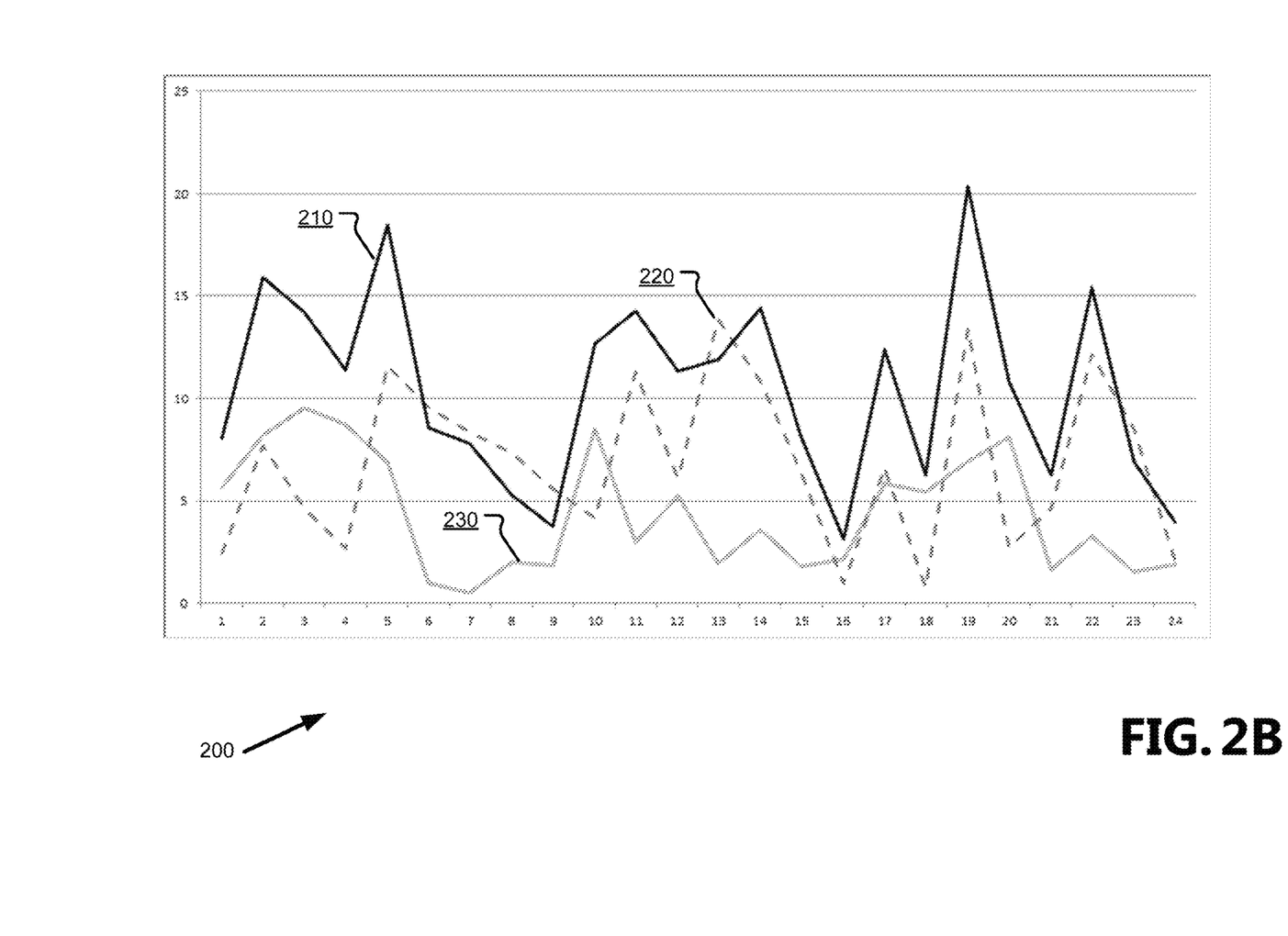

FIGS. 2A and 2B are an example histogram 200 showing communication monitoring for a group sharing a given property. In FIGS. 2A and 2B, the observed communications 210 to the group as measured by the observer 150 are illustrated with a solid line in the histogram 200, the predicted communications 220 to the group as estimated by the monitor 160 are illustrated with a dashed line in the histogram 200, and the difference plot 230 between the observed communications 210 and the predicted communications 220 is illustrated as a double line in the histogram 200. FIG. 2A illustrates a weekly view of the histogram 200 and FIG. 2B illustrates a daily view of the histogram 200, showing greater detail for one day.

The observed communications 210 are those communications noted by the observer 150 that match a given set of parameters for a group. Parameters may relate to various addressing information in the headers of IP packets, including, but not limited to: destination machines, source machines, message/request types, protocol of the message request, etc. The observer 150 will count the communications that are attempted in a given time period or periodically sample the gateway 140 for a number of communications attempted within a given timeslot. When plotted across time, the counts/samples are shown as the observed communications 210 in the histogram 200. These counts/samples are forwarded to the monitor 160, which is operable to use the counts/samples to build a predicted activity pattern for the network 130, subnetworks thereof, and individual machines 120, which are shown as the predicted communications 220 in the histogram 200.

In various aspects, the predicted communications 220 are generated by the monitor 160 by various techniques based on the observed communications 210 collected historically so that an expected amount of traffic for a given timeslot can be predicted based on historically observed amounts of traffic. For example, a regression model (linear or otherwise), a Gaussian process, a Poisson process, a Markov process, or a two state Gauss-Markov process may be used, alone or in combination, to estimate the number of connections that the observer 150 will see for a given grouping for a given time period. Because benign activity is structured (i.e., users typically have similar access patterns across time) the monitor 160 is operable to build predictions of counts/samples based on historical counts/samples of communications. For example, the monitor 160 may estimate that a given group will receive x communications at a given time based on previous counts/samples of X, Y, and Z communications at the same time on previous days, and may also take into account that it received y communications at a preceding time earlier on the same day to arrive at the estimation of x communications for the given time.

In contrast to benign activity being structured, malicious activity is sporadic; when a malicious party begins an attack is independent of the user's patterns of use and, due to security measures, these attacks begin and end quickly—showing a sharp increase in communications. Using a threshold, for a number of communications and/or a speed at which communications are made, is a basic safeguard, but cannot distinguish benign activity from malicious activity effectively, especially when a user is using many machines 120 that are being concurrently attacked as a group, but are being sporadically attacked individually. For example, if the threshold is set too low, false positives will be returned which will inconvenience users and require the expenditure of computing resources to transfer machines 120, block ports, secure accounts, etc., and to potentially undo those security measures when it is determined that they were taken in response to a false positive. Similarly, if the threshold is set too high, some attacks will go undetected, and malicious parties may gain access or block access to the attacked systems. Instead, by using the difference between the observed communications and the predicted communications gathered at the network level, the present disclosure enables the observation of attacks made against multiple machines 120 that would have individual volumes too low to detect individually, but in aggregate are detectable as an attack, and with a lower rate of false positives.

Although the difference plot 230 is graphed in the histogram 200 as an absolute difference between observed and predicted communications (i.e., is always positive), the difference may retain its sign (positive or negative) so that is may be compared to a difference threshold, so that when a number of observed communications 210 exceeds a number of predicted communications 220 by a set amount or a set percentage from the number of predicted communications 220, the connections will be marked as including an attack and security measures may be taken (port blocking, moving a machine 120, securing an account, etc.). In yet other aspects, the difference threshold may be a percentage that is determined to be statistically significant (where the null hypothesis assumes that there is not an attack) and the threshold will be set by a p-value, which will take into account a number of samples used to build the predictive model for the estimates; the p-value may depend on the statistical basis and vary as more data are collected.

Figure 3:
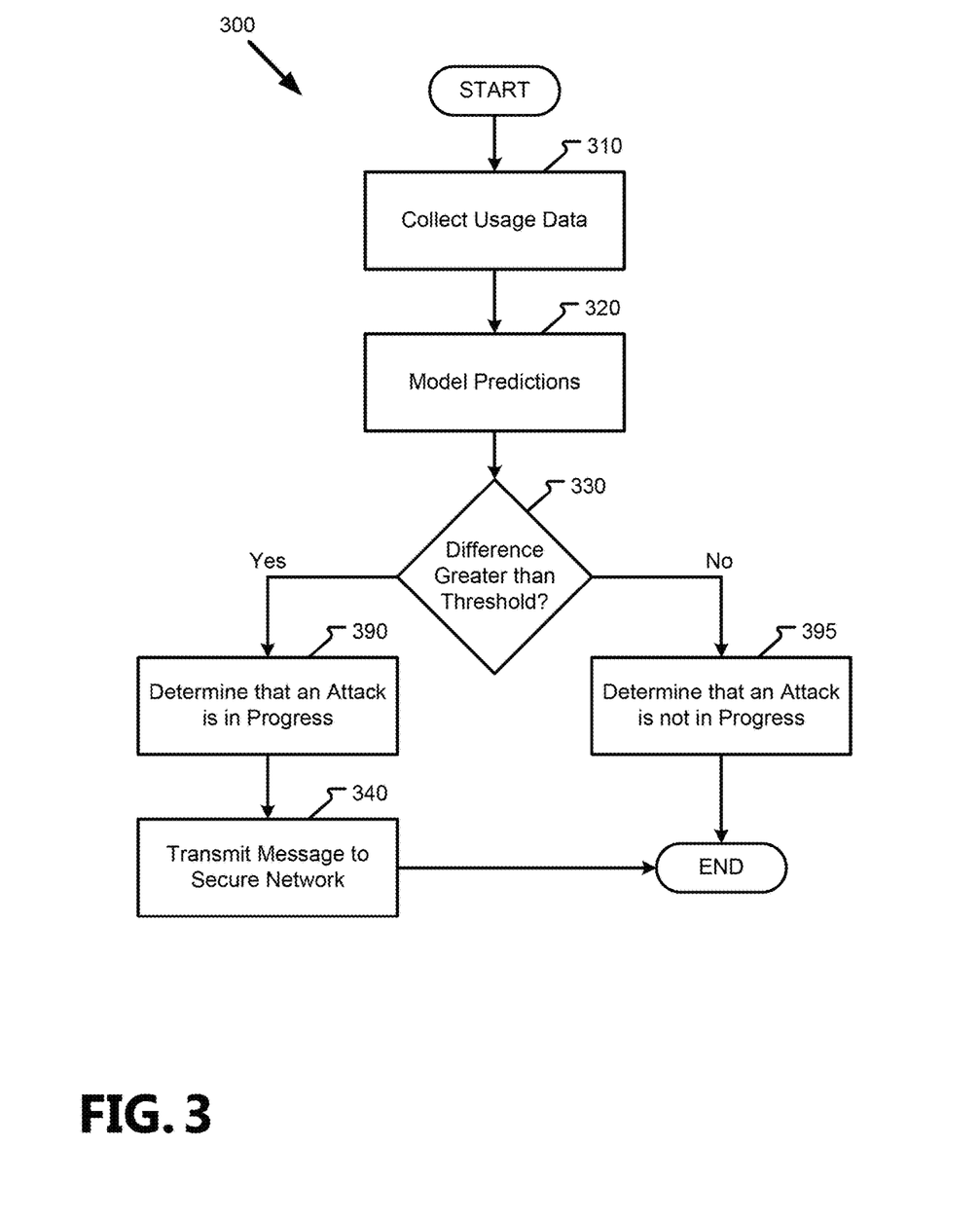
FIG. 3 is a flowchart showing general stages involved in an example method for identifying attacks at the network level.

FIG. 3 is a flowchart showing general stages involved in an example method 300 for identifying attacks at the network level. Method 300 begins at OPERATION 310 where usage data are collected. In various aspects, the usage data are collected for a set period of time (i.e., a timeslot) from the machine 120 or group of machines 120 during normal operation before method 300 is allowed to proceed to OPERATION 320 (a training period), while in other aspects, the usage data are collected from the usage data of similar machines 120; using their data as a substitute for an individual training period. For example, the usage data for a group of eight machines 120 may be collected over a course of several weeks to determine the patterns of use for the tenants of those machines 120. Continuing the example, when a new machine 120 of the same type as the eight machines 120 is added to the group, the usage data for the eight machines 120 may be extrapolated to "collect" the usage data for the new machine 120. In various aspects, collecting usage data via extrapolation may use a multiplier effect (e.g., old usage data multiplied new number of machines 120, divided by old number of machines 120) or may use the old usage data without modification, such as, for example, when machines 120 are added or removed from a group for load balancing purposes. In various aspects, usage data are continuously collected or sampled at set time intervals, and accordingly method 300 may run continuously or repeat at each sampling time interval.

When method 300 proceeds to OPERATION 320, predictions are modeled for the group's usage patterns. The prediction models take into account training data (i.e., data from usage data collected or simulated during a training period), and live data from previous time periods as set as equivalent time periods by the tenant. Equivalent time periods may include times of day (e.g., 8:00 am, 10:00 pm, 12:07:35 am), days of the week (e.g., Monday, Tuesday, Saturday), position in a month (first week, second week, final week), and months for which multiple time periods may share in common as part of a cycle of time. These equivalent time periods are cyclical in nature (e.g., for a given system 8:00 am occurs every twenty-four hours, Monday occurs once every week, etc.) and showcase cyclical patterns in the use of the machines 120 (e.g., use for a week may show heavy use on weekdays during business hours and low use during other times). Equivalent time periods may include combinations of the time periods (e.g., the expected usage for Monday at 8:00 am in the final week of June), and the use patterns may include exceptions to the use patterns for known or identified holidays that will supersede the otherwise cyclical use patterns. For example, the normal predicted use pattern for the first Wednesday in January may be modified by the use pattern for New Year's Day if the first Wednesday falls on the first of January so that a holiday predicted usage amount will be used.

Depending on the model used for predicting the connections, the recentness of the historic data may be weighted differently. For example, when predicting the number of connections for 8:00 am, different weights for the measured connections from today at 7:59 am, yesterday at 8:00 am, last week on the same day at 8:00 am, etc. may be applied. Additionally, the difference between predicted and actual connections from previous runs of method 300 may be used to update and improve the predicted model for the current or future runs of method 300.

Once a predicted use model is complete and usage data are collected, method 300 proceeds to DECISION 330, where it is determined whether the difference between the amounts of observed usage and predicted usage exceeds a threshold. In various aspects, the threshold may be a set amount (e.g., five connections) or may be a percentage of the predicted usage amount (e.g., a statistically significant amount, five percent above the predicted usage). When it is determined that the difference exceeds the threshold, method 300 proceeds to DETERMINATION 390, where it is determined that an attack is in progress. When it is determined that an attack is in progress, method 300 will proceed to OPERATION 340, where a message is transmitted to secure the network 130. In various aspects, this message may be sent to the machines 120 under attack to secure accounts being attacked (e.g., lock the accounts, restrict access from the account to sensitive files/systems, flag the accounts for manual inspection, signal VMs to migrate to new host machines or to change their IP addresses). In other aspects, the gateway 140 may be signaled to block ports into the network 130 or blacklist a given set of IP addresses from which the messages comprising the attack originate (and/or a whitelist of IP addresses may be used to retain access from known-good sources). The security measures may be targeted in their applications so that only machines 120 comprising an attacked group are affected by the security measures (e.g., an attacked VM may be migrated to a new host machine, but the other VMs provided on that host machine may remain hosted thereon).

When it is determined that the difference does not exceed the threshold, method 300 proceeds to DETERMINATION 395, where it is determined that an attack is not in progress. When there is no attack in progress, the network 130 is determined to be working at or below nominal or predicted levels of operation, and the monitor 150 may signal the network 130 that it may continue operating as normal or, if security measures have previously been taken, that it may lift the security measures (e.g., unlock the accounts, re-allow access from the account to sensitive files/systems, unflag the accounts from needing manual inspection). Depending on where the security measures were implemented, the monitor 150 will send an all-clear message to the gateway 140 or the machine 120 in aspects where an all-clear message is transmitted.

Method 300 may then conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
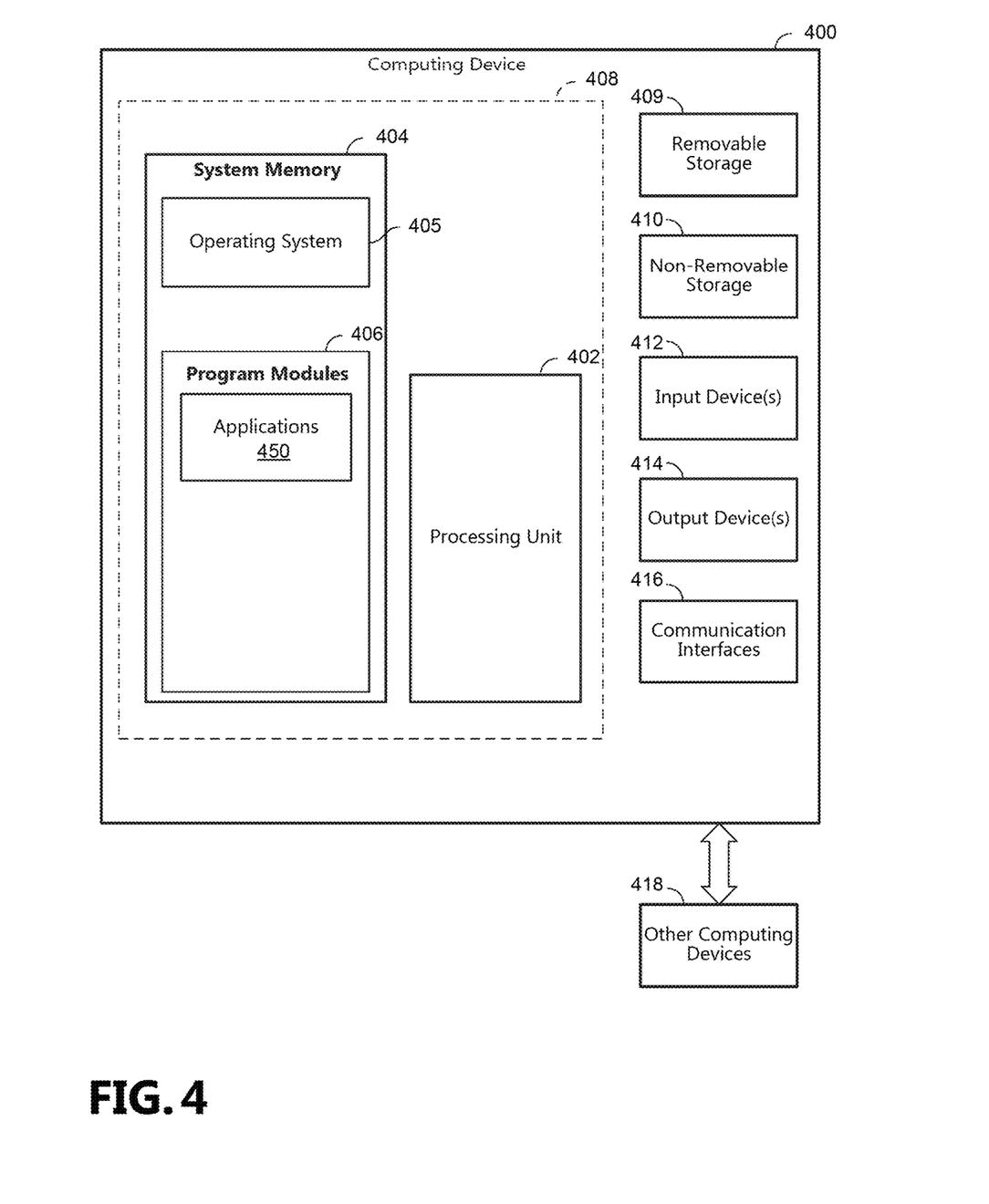
FIG. 4 is a block diagram illustrating physical components of a computing device with which examples may be practiced.
Figure 5A:
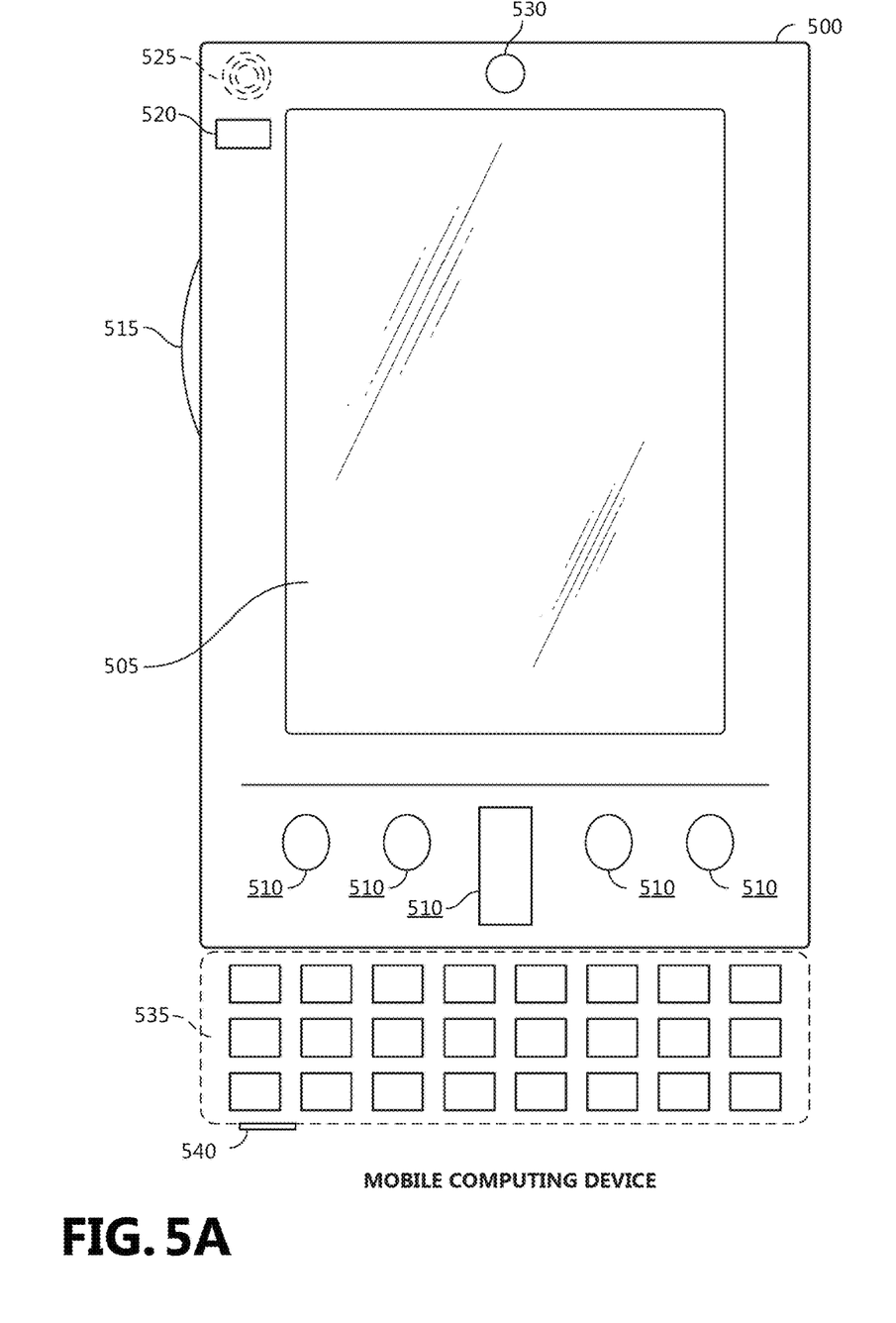
FIGS. 5A and 5B are block diagrams of a mobile computing device with which aspects may be practiced.
Figure 5B:
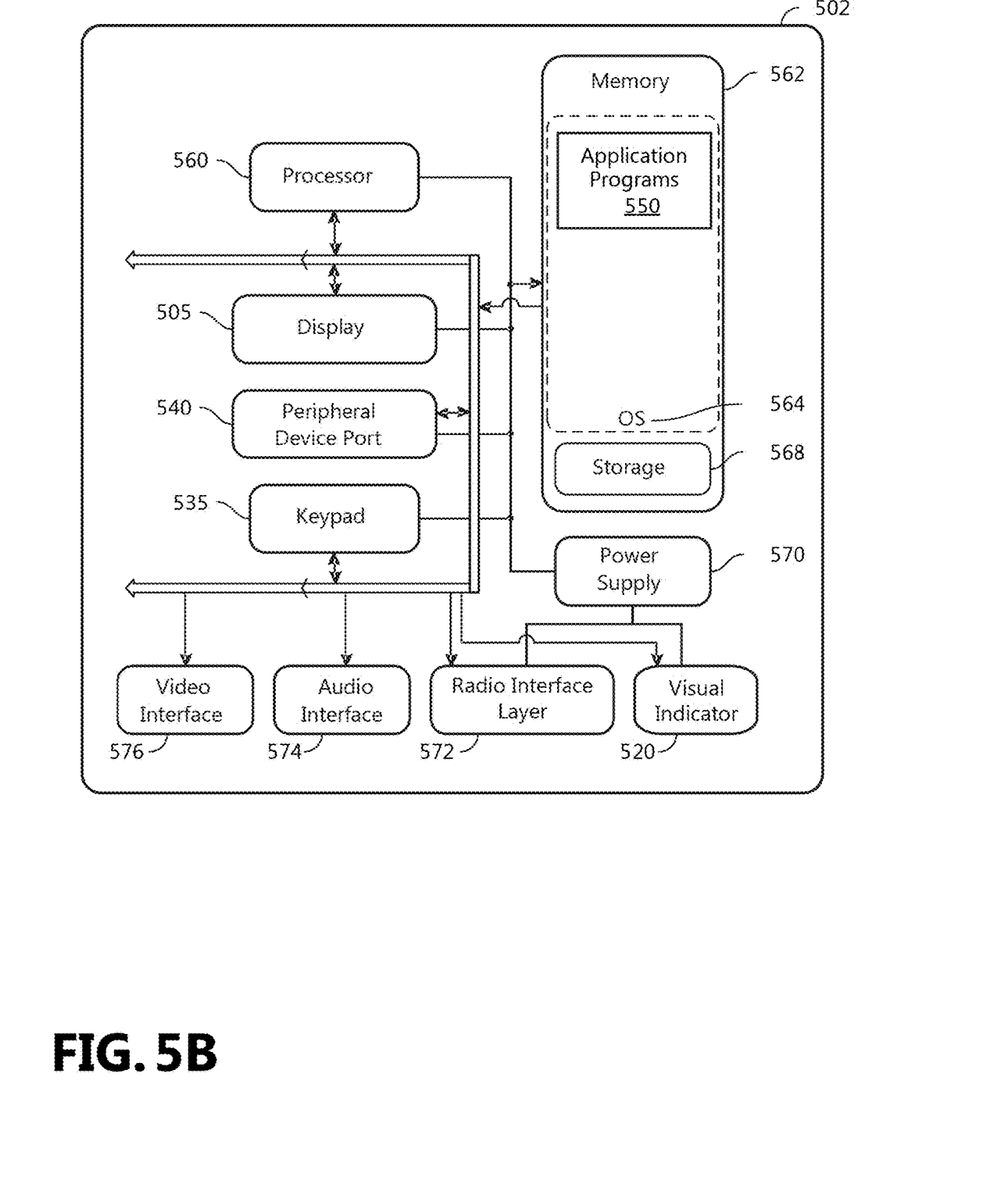

FIGS. 4, 5A, and 5B and the associated descriptions provide a discussion of a variety of operating environments in which examples are practiced. However, the devices and systems illustrated and discussed with respect to FIGS. 4, 5A, and 5B are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes virtual instances of an observer 150 and a monitor 160 to enable a software application 450 to employ the teachings of the present disclosure via stored instructions. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., observer 150 and monitor 160) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication interfaces 416 allowing communications with other computing devices 418. Examples of suitable communication interfaces 416 include, but are not limited to: radio frequency (RF) transmitter, receiver, and/or transceiver circuitry; universal serial bus (USB) ports, parallel and/or serial ports, and Ethernet ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced or may be used as an external device 110. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates a peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, client used to access the network is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated, such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for detecting volumetric attacks on a network, comprising:
   collecting usage data for the network for a given timeslot, wherein the network comprises a plurality of distributed machines hosting a plurality of services, wherein the usage data comprises network traffic to the network;
   sampling the usage data into a plurality of groups, wherein sampling the usage data comprises:
      sampling the usage data in a first group comprising the network traffic to the network as a whole; and
      sampling the usage data into a second group comprising the network traffic associated with a subset of the plurality of distributed machines, the subset of the plurality of distributed machines being determined based on grouping parameter;
   comparing the sampled usage data for each of the plurality of groups to a predicted usage amount for the given timeslot to yield a difference;
   comparing the difference to a threshold; and
   when the difference exceeds the threshold, applying security measures to the network.

2. The method of claim 1, wherein the predicted usage amount is created based on historic usage data.

3. The method of claim 2, further comprising:
   wherein the predicted usage amount is for a subset of machines hosted in the network;
   wherein the historic usage data are for the subset; and
   wherein the security measures applied to the network are targeted to the subset.

4. The method of claim 2, wherein the historic usage data are collected during a training period.

5. The method of claim 1, wherein the threshold is based on a percentage of the predicted usage amount.

6. The method of claim 1, wherein an observer collects the usage data for the network by sampling at a set time interval a number of connections to machines hosted in the network via gateways of the network.

7. The method of claim 1, wherein the security measures include at least one of the following:
   locking an account;
   restricting access for the account;
   blocking a network port; and
   moving machines hosted within the network to new addresses.

8. The method of claim 1, wherein the previous timeslot is determined to be equivalent to the given timeslot based on a cycle including a time of day and at least one of:
   a day of week;
   a week of month; and
   a month of year.

9. The method of claim 8, further comprising: when the given timeslot falls on a holiday, overriding a selection of the predicted usage amount based on the cycle and substituting a holiday predicted usage amount based on the historic usage data for the holiday.

10. The method of claim 1, wherein sampling the usage data comprises sampling the usage data based on a packet flow protocol implemented to load balance the network traffic of the network.

11. The method of claim 1, wherein the grouping parameter comprises at least one of the following: being received from a source, being transmitted to a destination, using a protocol, and being above, at, or below a predetermined size.

12. The method of claim 1, further comprising
sampling the usage data into a third group comprising the network traffic to one distributed machine of the network.

13. A system for detecting volumetric attacks on a network, comprising:
an observer in communication with a gateway of the network;
a monitor in communication with the observer, the gateway, and a plurality of machines hosted by the network;
wherein the observer is operable to observe a network traffic on the gateway between the plurality of machines hosted by the network and an external device hosted outside of the network;
wherein the monitor is operable to sample the network traffic, wherein the monitor being operable to sample the network traffic comprises the monitor being operable to:
sample packets being transmitted to the network into a first group comprising the packets being transmitted to the network as a whole, and
sample a subset of the packets being transmitted to the network into a second group, the subset of the packets comprising the network traffic to a subset of the plurality of distributed machines, the subset of the plurality of distributed machines associated with a grouping parameter;
wherein the monitor is further operable to compare the sampled network traffic to an expected network traffic for a given timeslot and determine a difference; and
wherein the monitor is further operable to signal the network to implement security measures when the difference exceeds a threshold.

14. The system of claim 13, wherein the monitor signals the network to implement security measures by at least one of the following:
signaling the gateway to block a port;
signaling the gateway to blacklist an IP address;
signaling the machine to lock an account;
signaling the machine to restrict access from the account; and
signaling the machine to migrate within the network.

15. The system of claim 13, wherein the observer periodically observes the network traffic by reading a log file for a packet flow protocol implemented in the network.

16. The system of claim 13, wherein the observer is provided on the gateway.

17. A method for detecting volumetric attacks on a network, comprising
sampling, by a traffic measurement probe, a network traffic being received at a gateway of the network, the network comprising a plurality of distributed machines, wherein sampling the network traffic comprises:
sampling the network traffic into a first group comprising packets being transmitted to the network as a whole, and
sampling the network traffic into a second group comprising packets being transmitted to a subset of the plurality of distributed machines, the subset of the plurality of distributed machines comprising a first type of distributed machines of the plurality of distributed machines, the first type of distributed machines being associated with a grouping parameter;
comparing the sampled network traffic to a predicted traffic amount at the given time to yield a difference;
comparing the difference to a threshold; and
when the difference exceeds the threshold, transmitting messages to the gateway to apply security measures to the network.

18. The method of claim 17, wherein the traffic measurement probe creates a log file for a traffic flow protocol implemented in the network, and wherein the log file is sampled.

19. The method of claim 17, wherein the difference and the sampled network traffic are incorporated into historic traffic amount for predicting a later traffic amount.

20. The method of claim 19, wherein the predicted traffic amount is correlated to the given time based on a proximity to the given time for a collection time for the historic traffic amount and based on an correlation of the collection time for the historic traffic amount to the given time in a cyclic relationship based on a time of day and a day of week.

* * * * *